United States Patent [19]

Leinhardt

[11] 4,202,945
[45] May 13, 1980

[54] PHENOLIC FOAM MATERIALS AND METHOD OF MAKING SAME

[76] Inventor: Franklyn J. Leinhardt, 1248 Wiltshire Rd., York, Pa. 17407

[21] Appl. No.: 26,664

[22] Filed: Apr. 3, 1979

[51] Int. Cl.² ............................................. C08J 9/14
[52] U.S. Cl. ................................. 521/121; 521/125; 521/181
[58] Field of Search ..................... 521/121, 181, 125

[56] References Cited

U.S. PATENT DOCUMENTS

| | | | |
|---|---|---|---|
| Re. 24,213 | 9/1956 | Blaricom et al. | 521/181 |
| 2,926,722 | 3/1960 | Lauring | 521/181 |
| 3,313,745 | 4/1967 | Klug | 521/121 |
| 3,740,355 | 6/1973 | Klug | 521/121 |

*Primary Examiner*—Morton Foelak
*Attorney, Agent, or Firm*—Cushman, Darby & Cushman

[57] ABSTRACT

A phenolic material having improved cell structure and surface skin characteristics is prepared by mixing, foaming and curing a foamable composition comprising a phenol-formaldehyde resin; an acid catalyst; a foaming agent-mixture containing a low boiling fluorocarbon, a surface active agent and a polyhydric alcohol; and a filler/extender mixture functioning as a cell structure control agent comprised of a water soluble inorganic salt and ammonium lignin sulfonate.

16 Claims, No Drawings

PHENOLIC FOAM MATERIALS AND METHOD OF MAKING SAME

BACKGROUND OF THE INVENTION

The present invention relates to an improved foamable composition, and a method using the improved composition to form a foamed phenolic material having improved surface skin and cell structure characteristics.

It is well known that foamed phenolic materials can be made by mixing a liquid phenol-formaldehyde resin or resole, an acidic curing agent, a foaming agent, a surface active agent and, if desired, one or more filler or extender materials, and foaming the resulting mixture to the desired configuration, whereafter it is cured. Such foamed phenolic materials are useful for various purposes including thermal insulation, acoustical packaging, filling material for voids or hollow spaces, packaging material for making moldings and as a replacement for such low density materials as balsa wood and low density urethanes. In these uses, however, foamed phenolic materials having superior surface skin characteristics, and a uniform and controllable density, are greatly desired.

In such foam systems, the curing agent, or catalyst, initiates the exothermic curing reaction of the resin. The heat given off by this exothermic reaction vaporizes the foaming agent, causing bubbles of gas to be formed *in situ* in the mixture, causing it to become foamed. The surface active agent helps to control the size and size distribution of the bubbles so formed. As the curing progresses, the foamed mixture becomes increasing viscous until the mixture is fully expanded and cured, thereby forming the solid foamed phenolic material.

The phenol-aldehyde resin or resole used in the known foamable compositions may be prepared by reacting phenol, or a derivative of phenol such as cresol, with an aldehyde. Most typically, formaldehyde is used, but other aldehydes are used on occasion, such as acetaldehyde. This reaction is generally carried out in the presence of water and an alkaline catalyst such as sodium hydroxide or potassium hydroxide in an amount of between about 1 to 50%, and at a temperature within the range of between about 50° C. to 125° C., and for a time period of between about 1 to 24 hours. However different quantities of catalysts and different times for reaction may be used as well.

After the resin reaction product has reached the desired state of reaction, it is customary to remove a portion of the water formed by the reaction. This partial dehydration can be effected by application of a vacuum. It may also be desired, although not required, to reduce the alkalinity of the resin formed. This resin, also known as a resole, is then ready for incorporation in a foamable composition.

Typically, the acidic curing agent or catalyst added to the foamable composition to solidify the phenol-formadelhyde resin is an aqueous solution of a strong acid such as an aromatic sulfonic acid, hydrochloric acid, or a sulfuric acid.

A number of different foaming agents have been developed and used in the art. These include water, which vaporizes to steam during the exothermic curing reaction, and salts of carbonic acid, such as sodium hydrogen carbonate or potassium carbonate, which react with the acidic curing agent to liberate carbon dioxide gas. Organic compounds which produce gases when heated by the exothermic curing reaction, such as dinitrosopentamethylenetetramine, have also been used. Preferably, however, the foaming agent is a volatile organic compound, for example, a low-boiling hydrocarbon such as hexane, or a low-boiling haloalkane such as trichloromonofluoromethane, which compounds are vaporized by the heat given off during the exothermic curing reaction.

Tyically the surface active agent used to control the bubble size of the foam is a silicone glycol copolymer, such as a low molecular weight polydimethylsiloxane.

Filler or extender materials may also be added to the mixture to be foamed, which are generally relatively inexpensive materials used to extend the bulk or volume of the foamable composition, and which also may modify or impart certain desired characteristics to the foamed material produced. Typical examples of filler/extender materials include asbestors, clay, mica, glass fibers, talc and silica sand, or certain organic materials such as wood flour, cork and the like.

When compared to competing foams made from other thermoset resins, such as urethane foams or urea foams, phenolic foams have three principle characteristics which may be disadvantageous in certain applications. These are (1) phenolic foams have little or no self-skinning ability; (2) it is very difficult to consistently and repeatedly foam a phenol-formaldehyde resin to a predetermined foam density; and (3) phenolic foams have a relatively high proportion of open cells when compared to competing foam material.

BRIEF DESCRIPTION OF THE INVENTION

Applicant has surprisingly found that these and other objectives can be obtained by preparing and foaming an improved foamable composition containing, in combination, a cell structure control agent comprised of a water soluble inorganic salt and ammonium lignin sulfonate, and a polyhydric alcohol, together with a phenol-formaldehyde resin or resole, acidic curing agent, a fluorocarbon foaming agent, a surface active agent, and, if desired, additional filler/extender materials.

The phenol-formaldehyde resin used may be one of several commercially accessible resins in water solution, or may be prepared by a known process. Most typically, formaldehyde will be reacted with phenol in the presence of water and an alkaline catalyst such as sodium hydroxide or potassium hydroxide, in an amount of between about 1 to 5%. The resin preparation is conducted at a temperature within the range of between about 50° C. to 125° C., and for a time period of between about 1 to 24 hours. After reaching the desired state of reaction, a portion of the water formed during the reaction may be removed, this partial dehydration preferably being effected by application of a vacuum. The alkalinity of the resin formed may also be reduced if desired. Although it is possible to use derivatives of phenol, such as cresol, or other aldehydes such as acetaldehyde, best results are obtained when a phenol-formaldehyde resin is used in conjunction with the improvement of the present invention. Preferably the phenolformaldehyde resin used will have a solid content of from about 62 to 77% by weight, and will comprise approximately 48 to 67% by weight of the total foamable composition.

The polyhydric alcohol utilized in the present invention can be any member of the family of aliphatic polyhydric alcohols, including ethylene glycol; propylene glycol; 1,3-propanediol; glycerol; 1,3-butanediol; 2,4- pentanediol; 1,5- pentanediol; 1,6-hexanediol; 2,2-dimethyl-1,3-propanediol; or 2-methyle-2,4-pentanediol. Most preferably 2-methyl-2,4-pentanediol, or hexylene glycol, is used. Typically, the polyhydric alcohol will be present in the foamable composition in an amount of approximately 4.5 to 8.5% by weight, relative to the phenol-formaldehyde resin.

The acidic catalyst is typically an aqueous solution of a strong acid such as an aromatic sulfonic acid, hydrochloric acid or sulfuric acid. Examples of suitable aromatic sulfonic acids include toluenesulfonic acid, phenolsulphonic acid and benzenesulfonic acid. The acid catalyst preferably will be present in the foamable composition in an amount of between 3.5 and 6% based on the weight of phenol-formaldehyde resin.

The phenol-formaldehyde resins can be expanded using any of a number of foaming agents as noted above. However, best results have been obtained in the present invention using a fluorocarbon, or most preferably a chlorofluorocarbon. Generally the amount of foaming agent present is the principle determinant of the density of the resulting foamed phenolic material, but will typically be in the range of between about 2 to 9% by weight of the phenol-formaldehyde resin. A surfactant or surface active agent is preferably added to the foamable mixture together with the blowing agent. Typically the surface active agent is added to the foamable composition in an amount of between about 4 and 8% relative to the weight of phenol-formaldehyde resin.

When using a known foamable phenolic resin composition, in practice the density of the resulting foamed phenolic material cannot be accurately predicted, nor can the resulting density be consistently repeated time after time. However it has now been found that the inclusion of a mixture of a water soluble inorganic salt together with a water-soluble derivative of lignin, most preferably ammonium lignin sulfonate, causes the foamable composition to expand in a predictable and reproducable manner. The water-soluble inorganic salt can be any of a number of soluble metallic salts, such as halides, nitrates, sulfates, phosphates, acetates and the like, specifically including lithium chloride, sodium sulfate, zinc acetate, or calcium nitrate. Most preferably calcium nitrate is used.

Preferably the water soluble inorganic salt is added in an amount of between about 12 to 15% by weight, and the ammonium lignin sulfonate in an amount of between about 10 to 15% by weight relative to the amount of phenol-formaldehyde resin in the foamable composition.

The preferred method for preparing the foamable composition of this invention is to first separately admix four basic component parts: (1) a phenolformaldehyde resin and water mixture; (2) an acid catalyst and water mixture; (3) a mixture of the foaming agent, surface active agent and the polyhydric alcohol; and (4) the cell structure control agent comprising a mixture of ammonium lignin sulfonate, water soluble inorganic salt and water. These four component parts are then admixed together and the resulting foamable composition is poured into a suitable vessel or mold. Shortly after the components are mixed, the foamable composition expands into a cellular body which thereafter sets into the solid foam.

To obtain the advantages of the present invention it is desirable to pre-heat at least the phenol-formaldehyde resin/water component, and preferably all of the components making up the foamable composition, to a temperature of between about 50° and 75° C., and most preferably to a temperature of between about 57° to 67° C. It is also advantageous to pre-heat the mold to a temperature within the range of between about 55° and 75° C., and preferably between about 65° and 70° C., particularly when curing relatively small volumes of foam, such as less than about 3,500 in$^3$. Altering the temperature to which the mold is pre-heated can also be used to determine and modify the rate of rise or foaming as well as the skin thickness.

When prepared in accordance with the method of the present invention utilizing the above noted foamable composition, the foamed phenolic materials obtained will hve a thick, solid, integral skin, and a uniform, pre-determined and repeatable foam density. By "uniform" foam density is meant that the foam density at any given point within the foam will not vary from the average foam density by more than about 2%. By varying the relative quantities of the various components, the density of the resulting foamed phenolic material can be controlled from about 1.5 to 77 pounds per cubic foot. The integral skin will generally have a density of approximately three times the interior foam density. Furthermore, the proportion of open cells in foamed phenolic materials prepared in accordance with the present invention will generally range between about 20 to 40%, as compared to typical prior art foamed phenolic materials which typically have from about 60 to 80% open cells. The final foamed material will contain approximately 40 to 56% by weight phenolic polymer, from about 15 to 20% by weight water soluble inorganic salt and about 25 and 35% ammonium lignin sulfonate.

DETAILED DESCRIPTION OF PREFERRED EMBODIMENTS

The present invention is further described by reference to the following examples which illustrate certain combinations of ingredients and proportions suitable for carrying out the present invention. It should be understood, however, that any number of ingredients and proportions consistent with the above disclosure, may be utilized.

EXAMPLE I

| COMPONENT | INGREDIENTS | PARTS |
|---|---|---|
| A | phenol-formaldehyde resin | 40 |
|   | water | 10 |
| B | toluenesulfonic acid | 5 |
|   | water | 5 |
| C | 1,1,2-trichlor-1,2,2-trifluoroethane | 5 |
|   | surface active agent | 1 |
|   | 2,4-pentanediol | 10 |
| D | ammonium lignin sulfonate | 8 |
|   | magnesium acetate | 12 |
|   | water | 4 |

The surface active agent is a silicone glycol copolymer.

Each of the four components is first admixed separately. Then the components are admixed together, and the resulting mixture poured into a suitable vessel or mold. After a few seconds, the mass expands into a cellular body which sets to a solid foam, which has a thick, solid integral skin, and a density of 19.9 pounds per cubic foot. When the formulation of Example I is repeated, the resulting foam again has a thick, solid integral skin, and a density of 19.9 pounds per cubic foot.

EXAMPLE II

The following are admixed and caused to react in the manner described in Example I.

| A | phenol-formaldehyde resin | 40 |
|---|---|---|
|   | water | 10 |
| B | sulfuric acid | 3 |
|   | water | 7 |
| C | 1,1,2-trichloro-1,2,2-trifluoroethane | 5 |
|   | surface active agent | 1 |
|   | 2,2-dimethyl-1,3-propanediol | 10 |
| D | ammonium lignin sulfonate | 8 |
|   | sodium nitrate | 10 |
|   | water | 6 |

This formulation forms a foam which has a thick, solid integral skin, and a density of 13.8 pounds per cubic foot. When the formulation of Example II is repeated, the resulting foam again has a solid, integral skin, and a density of 13.8 pounds per cubic foot.

EXAMPLE III

The following are admixed and caused to react in the manner described in Example I.

| A | phenol-formaldehyde resin | 40 |
|---|---|---|
|   | water | 10 |
| B | benzenesulfonic acid | 5 |
|   | water | 5 |
| C | trichlormonofluoromethane | 5 |
|   | surface active agent | 1 |
|   | 2-methyl-2,4-pentanediol | 10 |
| D | ammonium lignin sulfonate | 8 |
|   | calcium chloride | 10 |
|   | water | 6 |

This formulation forms a foam which has a thick, solid integral skin, and density of 15.5 pounds per cubic foot. When the formulation of Example III is repeated, the resulting foam again has a solid, integral skin, and density of 15.5 pounds per cubic foot.

EXAMPLE IV

The following are admixed and caused to react in the manner described in Example I.

| A | phenol-formaldehyde resin | 40 |
|---|---|---|
|   | water | 10 |
| B | sulfuric acid | 3 |
|   | water | 7 |
| C | tricholrmonofluoromethane | 5 |
|   | surface active agent | 1 |
|   | ethylene glycol | 10 |
| D | ammonium lignin sulfonate | 8 |
|   | calcium nitrate | 10 |
|   | water | 6 |

This formulation forms a foam which has a thick, solid integral skin, and a density of 18.0 pounds per cubic foot.

What is claimed is:

1. A foamable composition for use in preparing foamed phenolic materials comprised of a water soluble phenol-formaldehyde resole, an acid catalyst, a foaming agent mixture containing a low boiling fluorocarbon, a surface active agent and an aliphatic polyhydric alcohol, and a cell structure control agent comprised of from about 12 to 15% water soluble inorganic salt and about 10 to 15% ammonium lignin sulfonate, both by weight relative to the weight of said phenol-formaldehyde resole.

2. The foamable composition of claim 1 wherein said water soluble inorganic salt is selected from the group consisting of magnesium acetate, sodium nitrate, calcium chloride and calcium nitrate.

3. The foamable composition of claim 2 wherein said water soluble inorganic salt is calcium nitrate.

4. The foamable composition of claims 1 and 2 wherein said aliphatic polyhydric alcohol is 2-methyl-2,4-penanediol.

5. An improved method for the preparation of foamed phenolic materials from a foamable composition containing a water soluble phenol-formaldehyde resole, and an acid catalyst, a low boiling fluorocarbon foaming agent and a surface active agent, said improvement comprising forming said foamable composition additionally containing an aliphatic polyhydric alcohol, and a cell structure control agent comprised of from about 12 to 15% water soluble inorganic salt and from about 10 to 15% ammonium lignin sulfonate, both by weight relative to the weight of said phenol formaldehyde resole in said foamable composition; pre-heating at least the phenol formaldehyde resole portion of said foamable composition to a temperature of between about 50° and 75° C.; and permitting said foamable composition to foam and cure to form said foamed phenolic composition.

6. The method of claim 5 wherein said water soluble inorganic salt is selected from the group consisting of nagnesium acetate, sodium nitrate, calcium chloride and calcium nitrate.

7. The method of claim 6 wherein said water soluble inorganic salt is calcium nitrate.

8. The method of claims 5 and 6 wherein said aliphatic polyhydric alcohol is ethylene glycol.

9. The method of claim 5 wherein at least the phenol-formaldehyde resole portion of said foamable composition is pre-heated to a temperature of between about 57° and 67° C.

10. The method of claim 5 wherein said foamable composition is poured into a mold wherein it is foamed prior to curing.

11. The method of claim 10 wherein said mold is pre-heated to a temperature of between about 55° to 75° C.

12. The method of claim 11 wherein said mold is pre-heated to a temperature of between about 65° and 70° C.

13. A foamed phenolic material having a uniform density of between 1.5 to 77 pounds per cubic foot and from about 20 to 40% open cells, said foamed phenolic material being comprised of from about 48 to 67% by weight phenol-formaldehyde polymer and, relative to the weight of said phenol-formaldehyde polymer, from about 15 to 20% water soluble inorganic salt and about 25 to 35 ammonium lignin sulfonate.

14. The foamed phenolic material of claim 13 wherein said water soluble inorganic salt is selected from the group consisting of magnesium acetate, sodium nitrate, calcium chloride and calcium nitrate.

15. The foamed phenolic material of claim 14 wherein said water soluble inorganic salt is calcium nitrate.

16. The foamed phenolic material of claims 13 and 14 wherein said aliphatic polyhydric alcohol is ethylene glycol.

* * * * *